United States Patent [19]

Kim

[11] Patent Number: 5,691,788
[45] Date of Patent: Nov. 25, 1997

[54] LCD HAVING A POLARIZATION OR DIFFUSION PLATE WITH AN IRREGULARLY COATED FIRST OPAQUE MATERIAL AND A BLACK MATRIX OF A SECOND OPAQUE MATERIAL

[75] Inventor: Dong-gyu Kim, Kyonggi-do, Rep. of Korea

[73] Assignee: Samsung Electronics Co., Ltd., Suwon, Rep. of Korea

[21] Appl. No.: 586,462

[22] Filed: Jan. 11, 1996

[30] Foreign Application Priority Data

Jan. 6, 1995 [KR] Rep. of Korea .......................... 95-182

[51] Int. Cl.$^6$ .................... G02F 1/1335; G02F 1/1333
[52] U.S. Cl. ..................... 349/96; 349/110; 349/112
[58] Field of Search ................. 359/40, 41, 48, 359/49, 63, 69; 349/64, 110, 112, 96

[56] References Cited

U.S. PATENT DOCUMENTS

| | | | |
|---|---|---|---|
| 4,984,872 | 1/1991 | Vick | 349/112 |
| 5,150,138 | 9/1992 | Nakanishi et al. | 359/40 |
| 5,159,478 | 10/1992 | Akiyama et al. | 359/69 |
| 5,161,041 | 11/1992 | Abileah et al. | 359/49 |

FOREIGN PATENT DOCUMENTS 94-7576  4/1994  Rep. of Korea .

OTHER PUBLICATIONS

S. Kaneko et al., "Wide–Viewing–Angle Improvements for AMLCDs", SID 93 Digest, pp. 265–268.
Y. Mesaki et al., "New Backlighting Technologies for LCDs", SID 94 Digest, pp. 281–284.
"Up–to–Date Trends of Polarization and Phase Difference Plate", Semiconductor World, p. 256.

*Primary Examiner*—William L. Sikes
*Assistant Examiner*—Walter Malinowski
*Attorney, Agent, or Firm*—Cushman Darby & Cushman IP Group of Pillsbury Madison & Sutro LLP

[57] ABSTRACT

A liquid crystal display with an improved viewing angle is disclosed which prevents gray scale inversion within a range of 60° in every direction because the change of a gray level according to the viewing angle is small. Light transmitted through the liquid crystal is scattered by a diffusion plate so that the brightness in front can be improved instead of narrowing the viewing angle, or uniform screen quality can be obtained by widening the viewing angle. The diffusion coefficient of the diffusion plate can be easily controlled. Further, it is possible to prevent a decrease in contrast due to external ambient light by screen-printing a black matrix pattern or atomizing a black dye on the diffusion plate.

15 Claims, 4 Drawing Sheets

LCD HAVING A POLARIZATION OR DIFFUSION PLATE WITH AN IRREGULARLY COATED FIRST OPAQUE MATERIAL AND A BLACK MATRIX OF A SECOND OPAQUE MATERIAL

BACKGROUND OF THE INVENTION

A. Field of the Invention

The present invention relates to a liquid crystal display with an improved viewing angle. More particularly, the present invention relates to a liquid crystal display with an improved viewing angle having a diffusion layer for diffusing light transmitted from a liquid crystal display LCD cell.

B. Description of Related Art

Liquid crystal displays (LCD's) are well known to have both home as well as industrial and other applications such as cars, laptop computers and pocket computers because the LCD is light and inexpensive, and its power consumption is low, thereby matching well with integrated circuits.

Generally, a thin film transistor TFT liquid crystal display LCD includes a TFT array substrate having a switching element such as a thin film transistor TFT and a pixel electrode, a color filter substrate having a color filter, a liquid crystal material between the TFT array substrate and the color filter substrate, a polarization plate attached to outer surfaces of both substrate, and a backlight having a diffusion layer.

One type of LCD uses a twisted-nematic TN liquid crystal material. The contrast of such TN liquid crystals is angle dependent, since the transmissivity of each gray level depends on the viewing angle. This angle dependence of contrast is very serious vertically. Angle dependence in the vertical direction is caused due to orientation of an electrically inducted liquid crystal director.

Electric and optical characteristics of the TN-LCD are due to anistropy of the liquid crystal. More particularly, TN-LCDs suffer from viewing angle dependency because the molecular liquid crystal material filled between the two substrates forms an optical axis and the direction of the viewing angle is formed along this optical axis. A viewing angle range of about 90° is formed only within a range centered on the optical axis. This viewing angle range becomes narrower as the optical anisotropy of the liquid crystal material increases.

Thus, other types of LCDs having a wider viewing angle have been proposed.

A pixel divided twisted nematic cell and a multi-domain twisted nematic cell are disclosed in "Wide-Viewing-Angle Improvements for AMLCDs," at pages 265 to 268 of SID 93 DIGEST and in pages 591 to 594 of Japan DISPLAY '92.

The multi-domain TN cell will be explained hereinafter. A TN cell has horizontal symmetry but vertical asymmetry in the viewing characteristics. By making an individual pixel with multi-domains that are summed, the optical transmittance of each of the domains have different viewing characteristics. Thus, the average of the multiple domains provides for a wider viewing angle range, on average.

Two domain TN (TDTN) cells have been proposed by K. H. Yan as the simplest multi-domain cell (IDRC 91 Digest, p.68). LC directors in the two domains are tilted in opposite directions in the vertical direction as well as in the horizontal direction to complement the optical transmittance of one domain having a wide upper viewing range with that for another domain having a wide lower viewing range in TDTN cells.

In order to realize the TDTN cell, multiple rubbings on a polyimide coated substrate with a mask have been employed. This requires 2 photolithography and 4 rubbing steps for the two substrates. These steps are complicated and the polyimide alignment layer is sometimes damaged by alkaline development process during photolithography.

To overcome the above-mentioned disadvantage, K. Takatori et al. also proposed complementary TN (C-TN) cells. With this structure, only one substrate surface is divided into two domains with a high pretilted alignment, while the other substrate surface has a low pretilted alignment. This process is relatively simple with 1 photolithography step and 3 rubbing steps.

In addition, Y. Koike et al. proposed domain divided (DDTN) cells to simplify the fabrication process. In DDTN cells, alignment is achieved by a single rubbing of patterned organic and inorganic alignment layers on each substrate. Therefore, this process contains 2 photolithography steps, 2 rubbing steps and additional inorganic alignment layers for the 2 opposing substrates. In both C-TN and DDTN cells, the domains are controlled by the helical power of the LC materials and by the pretilt.

However, DDTN cells gave disadvantages because the number of the process steps is greater than desired and the yield is reduced since the photolithography step and several rubbing steps are required with the same alignment of the liquid crystal.

A conventional backlight will now be explained with reference to the accompanying drawings.

Since the LCD itself does not emit light, a backlight for emitting light is attached to a rear surface of the substrate. Electro-luminescent displays (EL) and fluorescent lamps are typical.

An EL display is a solid device typically used in personal wordprocessors or laptop personal computers owing to its thin, light and flexible characteristics. However, it has disadvantages because its brightness is low and lifetime is short. Thus, it cannot be applied in LCD Tvs, cars or other application needing a high brightness or an extended life.

Fluorescent lamps can be classified as linear pipe type, U-type and flat plate type. The linear pipe type and the U-type fluorescent lamps both can use a reflection plate as part of the lighting structure. In addition, fluorescent lamps can be classified by the way they discharge electrodes: there exists a hot-cathode method and a cold-cathode method. The cold-cathode method is widely applied because of its long life span.

The construction and operation of a conventional linear pipe type fluorescent lamp will be explained in detail hereinafter with reference to the accompanying drawings.

FIG. 1 is a partial sectional perspective view illustrating a construction of a conventional linear pipe type fluorescent lamp which uses a reflection plate.

The conventional linear pipe type fluorescent lamp, which uses a reflection plate includes a reflection plate 103 such as glass formed in a lower part of a lamp 101, such as a fluorescent pipe, an optical screen 102 for changing the transmissivity according to the position of the lamp to improve uniformity of brightness which is formed in an upper part of the lamp 101, and a diffusion plate 104 having a diffusion transmissivity for improving uniformity of brightness which is formed on the optical screen 102.

Such a conventional linear pipe type fluorescent lamp using a reflection plate method utilizes light efficiently and is excellent because brightness can be improved, but has a disadvantage of a large thickness.

FIG. 2 is a sectional view illustrating the construction of a conventional linear pipe type fluorescent lamp which uses a light guiding plate (Refer to SID 94 DIGEST p. 283).

A conventional linear pipe type fluorescent lamp using a light guiding plate includes a lamp 1 formed in one side of a light guiding plate 5 made of a transparent material such as acrylic resin. A lamp holder 2 holds the lamp 1, reflects light emitted from the lamp 1 and covers the lamp 1 outside the light guiding plate 5. A reflection plate 3 is made of glass and formed on a lower surface of the light guiding plate 5. A diffusion plate 4 having diffusion transmissivity for improving uniformity of brightness is formed on an upper surface of the light guiding plate 5.

Light emitted from the lamp 1 goes through several paths in this type of device, as shown in FIG. 2. Light $P_1$ goes directly into the light guiding plate 5. Light $P_2$ is initially directed toward the lamp holder 2, is reflected from the lamp holder 2, and enters the light guiding plate 5. Light $P_3$ is initially directed toward the lamp holder 2 and is absorbed by the lamp holder 2. Light $P_4$ is initially directed toward the lamp holder 2, is reflected by the lamp holder 2 and returns to the lamp 1. Light $P_5$ directly passes into the diffusion plate 4 without passing through the light guiding plate 5.

One disadvantage of the linear pipe type fluorescent lamp and light guiding plate is that power is wasted since light is emitted into an invalid viewing angle range.

To solve the above-mentioned disadvantage, Korean Unexamined Patent Appln. No. 94-7576 has disclosed a device which can prevent light from being omitted in the invalid viewing angle range by using a prism, and improve the intensity of the light emitted within a valid viewing angle range, as illustrated in FIG. 3.

In the above-mentioned device, a prism 6 is formed on the top of the light guiding plate as illustrated in FIG. 2.

In this device, light is only emitted between the angles of $R_4$ and $R_6$ since the light beyond this range of viewing angles is totally internally reflected due to the critical angle of the prism 6, and remains within the light guiding plate 5 as illustrated in FIG. 3. $R_i$ (i=1, 2, . . . , 7) represents an advancing light ray, and reference numeral 10 indicates the liquid crystal cell.

However, the conventional device has a disadvantage in that the viewing angle can not be improved because light $R_7$ passes through the liquid crystal cell 10 at a dead angle in which the gray inversion is weak.

SUMMARY OF THE INVENTION

The present invention overcomes the problems and disadvantages of the prior art by providing a LCD having excellent viewing angle characteristics comparable to a cathode ray tube by removing a fundamental cause of gray inversion according to a viewing angle without increasing the number of thin film transistor array processes or requiring additional processing of the liquid crystal. That is, the present invention overcomes the problems and disadvantages of the prior art by providing a liquid crystal display with improved viewing angle characteristics having a diffusion layer for diffusing light transmitted from a liquid crystal display LCD cell.

To achieve the objects and in accordance with the purpose of the invention, as embodied and broadly described herein, the liquid crystal display LCD comprises a backlight, a liquid crystal cell and a diffusion plate for diffusing light passing through the liquid crystal cell.

The diffusion plate is made of a transparent plate on which transparent material is coated ruggedly, opaque material is irregularly coated in a predetermined density on the transparent plate on which the transparent material used as the diffusion plate is coated, and opaque material is printed in the same shape as a black matrix pattern in the liquid crystal cell on the transparent plate on which the transparent material used as the diffusion plate is coated.

In addition, the transparent plate used as the diffusion plate is acrylic resin.

The above-mentioned LCD further includes light means for directing the light emitted from the backlight, which preferably includes a prism or a prism and a microlens array.

The diffusion plate can be inserted into the polarization plate of the liquid crystal cell.

Additional objects and advantages of the invention will be set forth in part in the description which follows, and will be clear from the description. The objects and advantages of the invention will be realized and attained by means of the elements and combinations particularly pointed out in the appended claims.

BRIEF DESCRIPTION OF THE DRAWINGS

The preferred embodiments of the present invention will now be described more specifically with reference to the attached drawings, wherein.

DESCRIPTION OF THE PREFERRED EMBODIMENTS

Reference will now be made in detail to preferred embodiments of the present invention, examples of which are illustrated in the accompanying drawings. Wherever possible, the same reference numbers will be used throughout the drawings to refer to the same or like parts.

Figure 4:
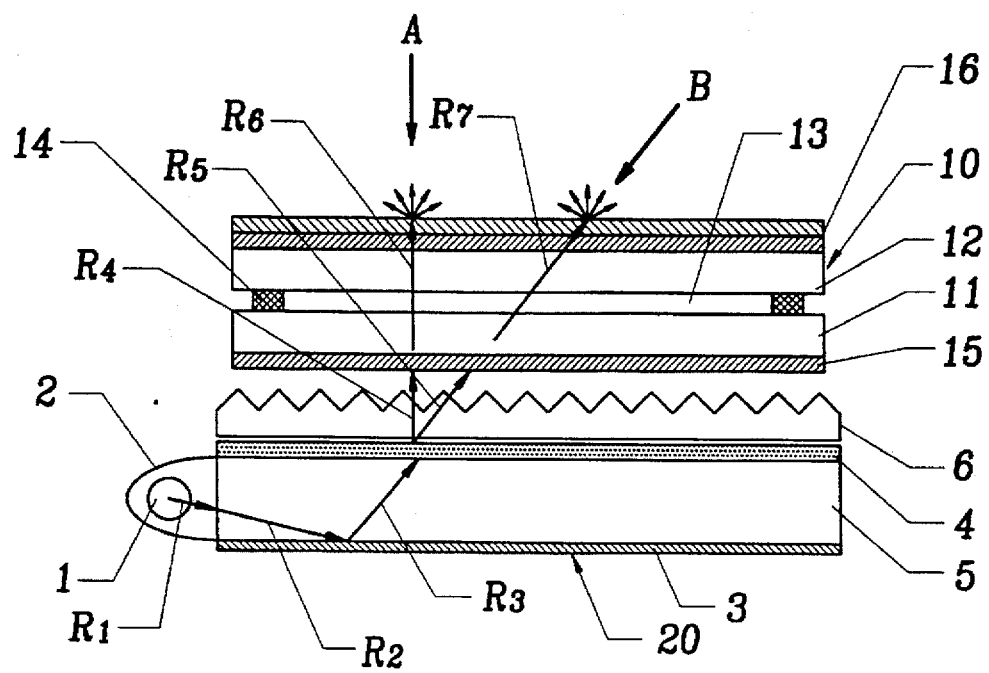
FIGS. 4 and 5 are sectional views illustrating a construction of an LCD according to a preferred embodiment of the present invention.

FIG. 4 is a sectional view illustrating a construction of an LCD according to a preferred embodiment of the present invention.

Figure 1:
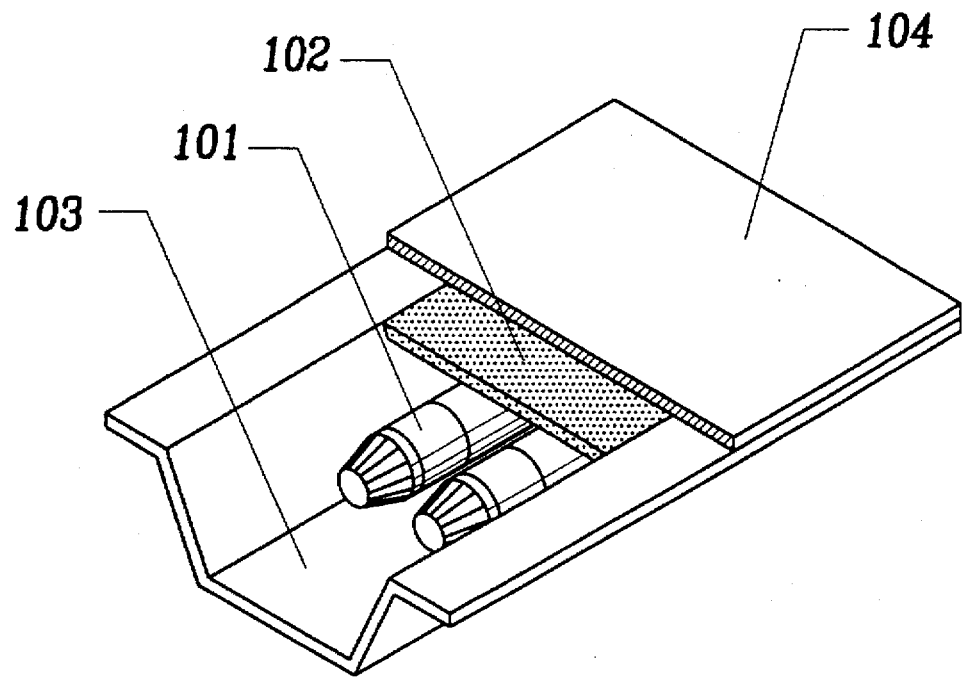
FIG. 1 is a partial sectional perspective view illustrating a construction of a conventional linear pipe fluorescent lamp and reflection plate.
Figure 2:
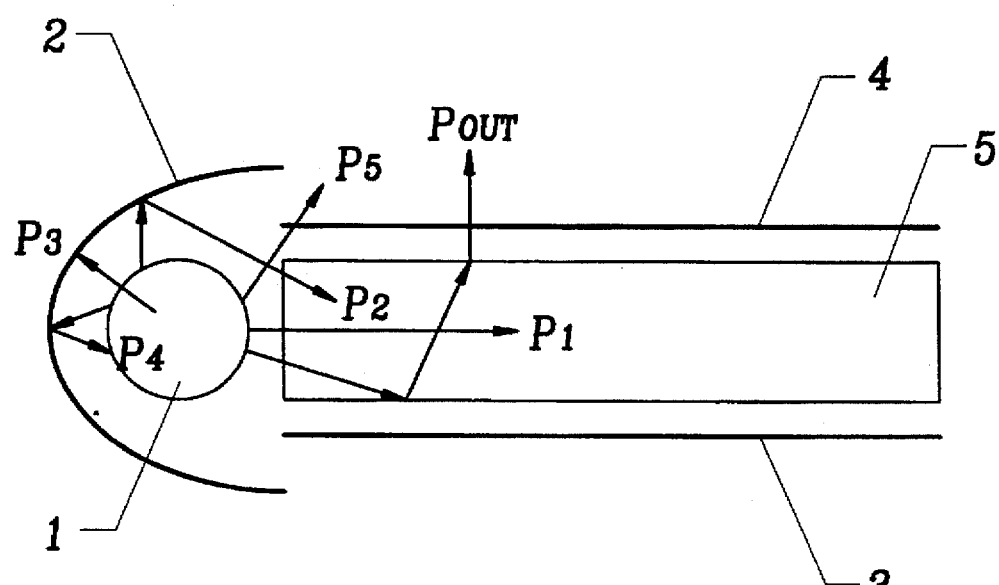
FIG. 2 is a sectional view illustrating a construction of a conventional linear pipe fluorescent lamp and light guiding plate.
Figure 3:
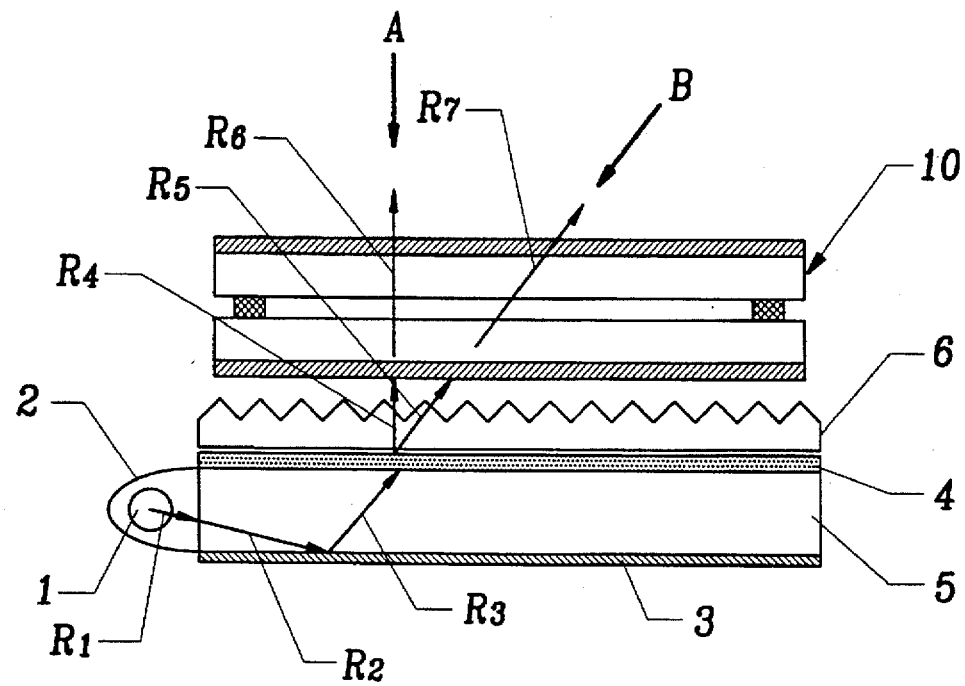
FIG. 3 is a sectional view illustrating a liquid crystal display LCD in which a prism is attached to the top of a light guiding plate.
Figure 5:
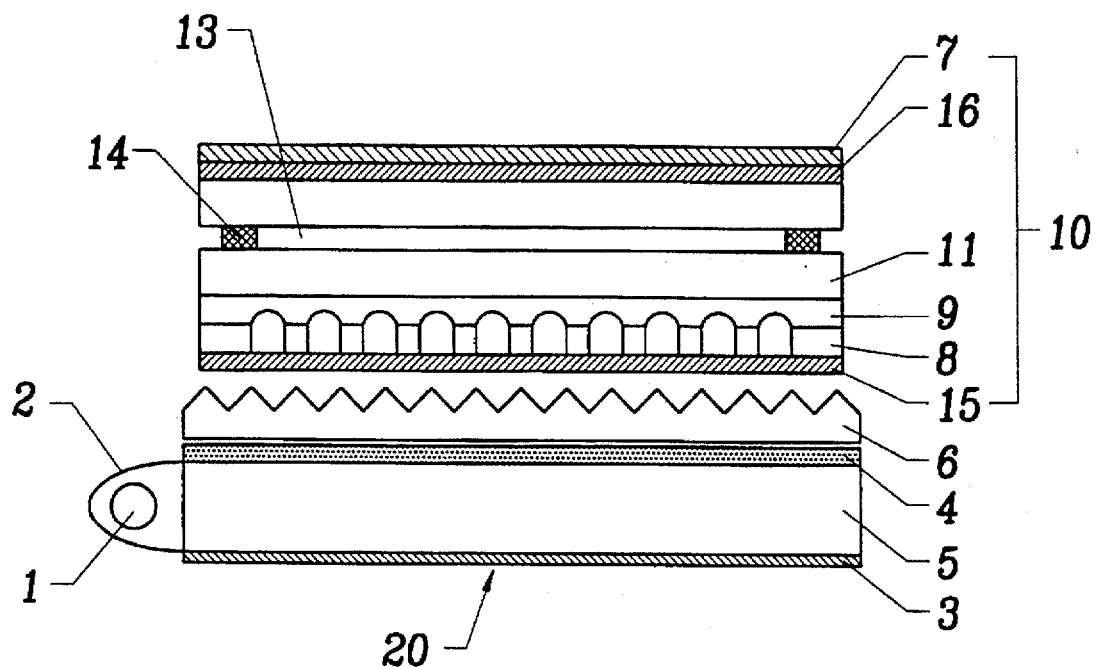

Referring to FIG. 4, a diffusion plate 7 for diffusing light transmitted from a liquid crystal cell 10 is formed on an upper surface of the liquid crystal cell 10. A backlight 20 is formed opposite the diffusion plate 7. Preferably, this backlight 20 is a linear pipe fluorescent lamp and light guiding plate as illustrated in FIG. 3. Light means for directing the light from the backlight 20 is formed in an upper surface of the backlight 20. A prism 6 may be used as shown in FIG. 4, or a microlens array can be used as illustrated in FIG. 5.

A lamp 1 is disposed at one side of a light guiding plate 5. This light guiding plate is preferably made of a transparent material such as acrylic resin having a diffusing surface. A cold-cathode tube lamp is generally used as the lamp 1. A lamp holder 2 for holding the lamp 1 and reflecting light emitted from the lamp 1 covers the lamp 1 outside the light guiding plate 5. A reflection plate 3 made of glass such as an Ag sheet is formed in a lower surface of the light guiding plate 5, and a first diffusion plate 4 having diffusion transmissivity for improving uniformity of brightness, such as an acrylic resin, is formed on an upper surface of the light guiding plate 5.

The liquid crystal cell 10 includes two transparent substrates 11 and 12 facing each other, a liquid crystal material 13 sealed between the two transparent substrates, a sealing material 14 and polarization plates 15 and 16 formed outside of the two transparent substrates.

A prism 6 is formed between the liquid crystal cell 10 and the backlight 20. An angle of the prism 6 is preferably set between 80° and 100°, and more preferably to 90°. Since an increase of front rotation degree is the greatest, that is, about 45 percent, when the angle of the prism 6 is about 90° (SID 94 DIGEST pp. 281 to 284, "New Blacklighting Technologies for LCDs").

A microlens array can be added on the upper surface of the prism 6 as illustrated in FIG. 5, where each microlens concentrates the light on an aperture. The microlens array 8 is adhered to an adhesion layer 9, is formed in a lower substrate 11 of the liquid crystal cell 10, and causes the light passing through the prism 6 to become parallel and filters it to a certain extent by focusing a focal length of the microlens.

A second diffusion plate 7 is made of a material which is capable of scattering the light. A scratched glass plate having a rugged structure on one surface or a rugged plate made by coating the transparent plate after atomizing transparent particles such as glass, acrylic or quartz on one surface of the transparent plate can be used as the second diffusion plate 7. Acrylic resin is preferably used because it is easy to process and it can be made very thin.

However, the light emitted from an ambient lamp or sunlight is reflected on a surface of the second diffusion plate 7 or scattered, whereby the screen appears gray rather than black when the second diffusion plate 7 is made of rugged transparent material and a screen is black.

Figure 7:
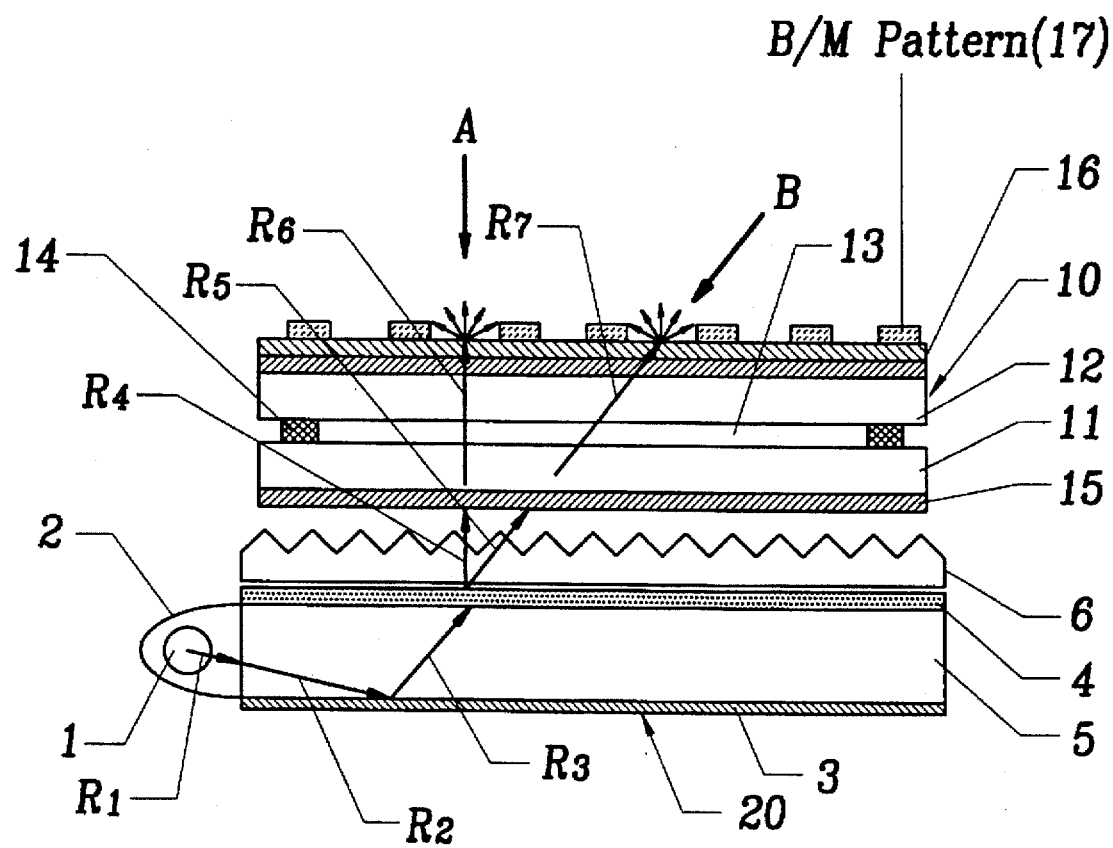
FIG. 7 is a sectional view illustrating a construction of an LCD according to yet another preferred embodiment of the present invention.

To overcome this problem, a pattern identical to a black matrix is formed in the substrate of the liquid crystal cell screen-print on the diffusion plate 7, and/or black dye is atomized on the diffusion plate 7 and coated. This black matrix pattern 17 absorbs the external light, such as light emitted from an ambient lamp or sunlight, as illustrated in FIG. 7.

Figure 6:
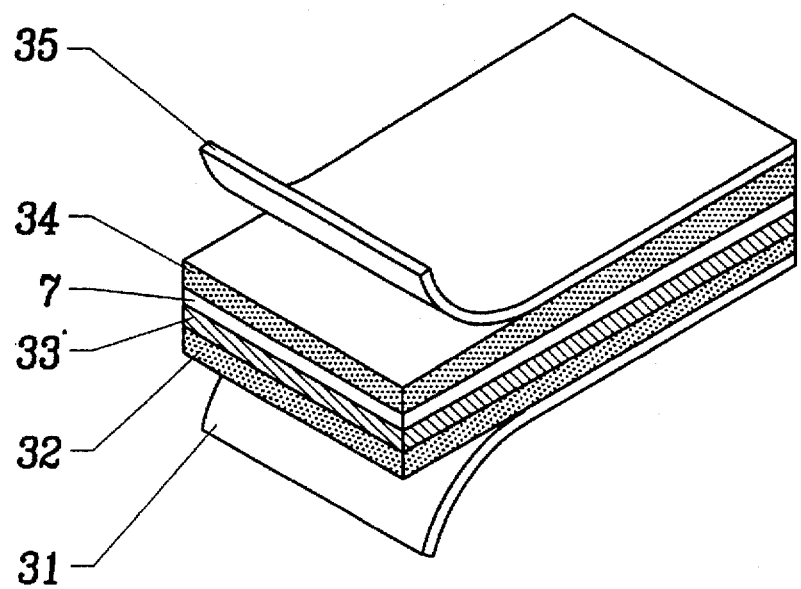
FIG. 6 is a perspective view illustrating a construction of a polarization plate for the LCD according to another preferred embodiment of the present invention.

The second diffusion plate 7 can be inserted into the polarization plate as illustrated in FIG. 6.

FIG. 6 is a perspective view illustrating a polarization plate in which a diffusion plate is inserted; a conventional polarization plate does not include the diffusion plate 7 illustrated in FIG. 6.

A conventional polarization plate includes a heterogeneous film 31, a first protection layer 32, a polarizer 33, a second protection layer 34 and a surface protection film 35 (Refer to "Up-to-date trends of polarization and phase difference plate" of p.256 of Semiconductor World, a monthly publication). The protection layers 32 and 34 protect the polarizer 33 and are made of transparent insulating material, and the heterogeneous film 31 and the surface protection film 35 are attached to the protection layers 32 and 34 for protection. It is not necessary to protect the second diffusion plate 7 additionally and it is possible to minimize the loss of light since the second diffusion plate 7 is directly and closely adhered to the polarizer 33 if the second diffusion plate 7 is inserted between the polarizer 33 and the protection layer 34, thereby obtaining the polarization plate as illustrated in FIG. 6.

The operation of the liquid crystal display with improved viewing angle characteristics according to a preferred embodiment of the present invention will now be explained in detail.

Light $R_1$ emitted from the lamp 1 in the direction of the light guiding plate 5 ($R_2$) is reflected from a reflection plate 3 ($R_3$). The reflected light $R_3$ is diffused in the light guiding plate 5 and a first diffusion plate 4, and the diffused light passes through the prism 6 for collecting the diffused light toward the liquid crystal cell ($R_4$ and $R_5$).

Light incident at an invalid angle is reflected at a boundary surface of the prism 6 according to the Total Reflection Principle and returns to the light guiding plate.

The light $R_4$ and $R_5$ passing through the prism 6 enters liquid crystal cell 10, passes through the liquid crystal cell 10, and impinges on the second diffusion plate 7 ($R_6$ and $R_7$). Since the transparent particles coated on the second diffusion plate 7 form the rugged structure on the acrylic resin plate, the light passing through the second diffusion plate 7 is diffused at a wide angle, whereby the viewing angle widens.

At this time, light $R_7$ passes through the liquid crystal cell 10 at a dead angle in which the gray inversion is weak. Thus, the light viewed from a viewing angle B is a combination of the diffused light A and light which has traversed the liquid crystal cell 10 at the dead angle. However, the light viewed from the viewing angle B is mainly made up of $R_6$, since the strength of $R_6$ is always greater than that of $R_7$. Accordingly, a change according to the viewing angle becomes equal at the viewing angles A and B.

In addition, it is possible to make the LCD multifunctional since the diffusion coefficient of the diffusion plate can be easily controlled. That is, the frontal brightness can be improved by forming the viewing angle to be narrow, and uniform screen quality can be obtained within a wide range by forming the viewing angle to be wide.

As described above, the liquid crystal display with an improved viewing angle according to the preferred embodiment of the present invention has advantages in that a gray scale inversion does not occur even within a range of 60° in every direction because the change of a gray level according to the viewing angle is small. By scattering the light transmitted through the liquid crystal with a diffusion plate, the brightness in front can be improved without narrowing the viewing angle and uniform screen quality can be obtained while widening the viewing angle since the diffusion coefficient of the diffusion plate can be easily controlled.

Further, it is possible to prevent a decrease in the contrast ratio due to external ambient light by screen-printing a black matrix pattern or atomizing black dye onto the diffusion plate, and thereby obtaining excellent screen quality compared to the conventional LCD.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. A liquid crystal display (LCD), comprising:
   a backlight;
   a liquid crystal cell;
   a diffusion plate for diffusing light after passing through said liquid crystal cell, said diffusion plate being made of a transparent plate on which transparent material is coated ruggedly;
   first opaque material irregularly coated with a predetermined density on said diffusion plate; and
   a black matrix of second opaque material printed on said diffusion plate with a pattern corresponding to a shape of said liquid crystal cell.

2. The LCD of claim 1, wherein said transparent plate comprises acrylic resin.

3. The LCD of claim 1, further comprising light means for causing the light emitted from said backlight to become parallel.

4. The LCD of claim 3, wherein said light means includes a prism.

5. The LCD of claim 4, wherein said light means further includes a microlens array.

6. The LCD of claim 5, wherein said liquid crystal cell includes upper and lower substrates with liquid crystal material sealed therebetween, and wherein said microlens array is formed in said lower substrate of said liquid crystal cell.

7. The LCD of claim 4, wherein an angle of said prism is 80° to 100°.

8. A polarization plate for a liquid crystal display (LCD), comprising:
   a polarizer;
   a diffusion plate for diffusing light attached to said polarizer, said diffusion plate being a transparent plate on which transparent material is ruggedly coated; and
   first opaque material irregularly coated with a predetermined density on said diffusion plate; and
   a black matrix of second opaque material printed on said diffusion plate with a pattern corresponding to a shape of a liquid crystal cell.

9. The polarization plate of claim 8, wherein said transparent plate comprises acrylic resin.

10. The polarization plate of claim 8, further comprising a protection layer for covering said polarizer and said diffusion plate, and being made of transparent insulating material for protecting said polarizer and said diffusion plate.

11. A liquid crystal display (LCD), comprising:
    a backlight;
    an liquid crystal cell; and
    a polarization plate disposed on a side of said liquid crystal cell opposite said backlight, said polarization plate including:
    a diffusion plate for diffusing light passing through said liquid crystal cell, said diffusion plate being made of a transparent plate on which transparent material is ruggedly coated; and
    first opaque material irregularly coated with a predetermined density on said diffusion plate; and
    a black matrix of second opaque material printed on said diffusion plate with a pattern corresponding to a shape of said liquid crystal cell.

12. The LCD of claim 11, wherein said diffusion plate is made of acrylic resin.

13. The LCD of claim 11, further comprising light means for causing light to be emitted from said backlight in parallel.

14. The LCD of claim 13, wherein said light means includes a prism.

15. The LCD of claim 14, wherein said light means further includes a microlens array.

* * * * *